Dec. 25, 1951     T. J. DEAHL ET AL     2,580,284
PRODUCTION OF SECONDARY AROMATIC AMINES
Filed April 11, 1949
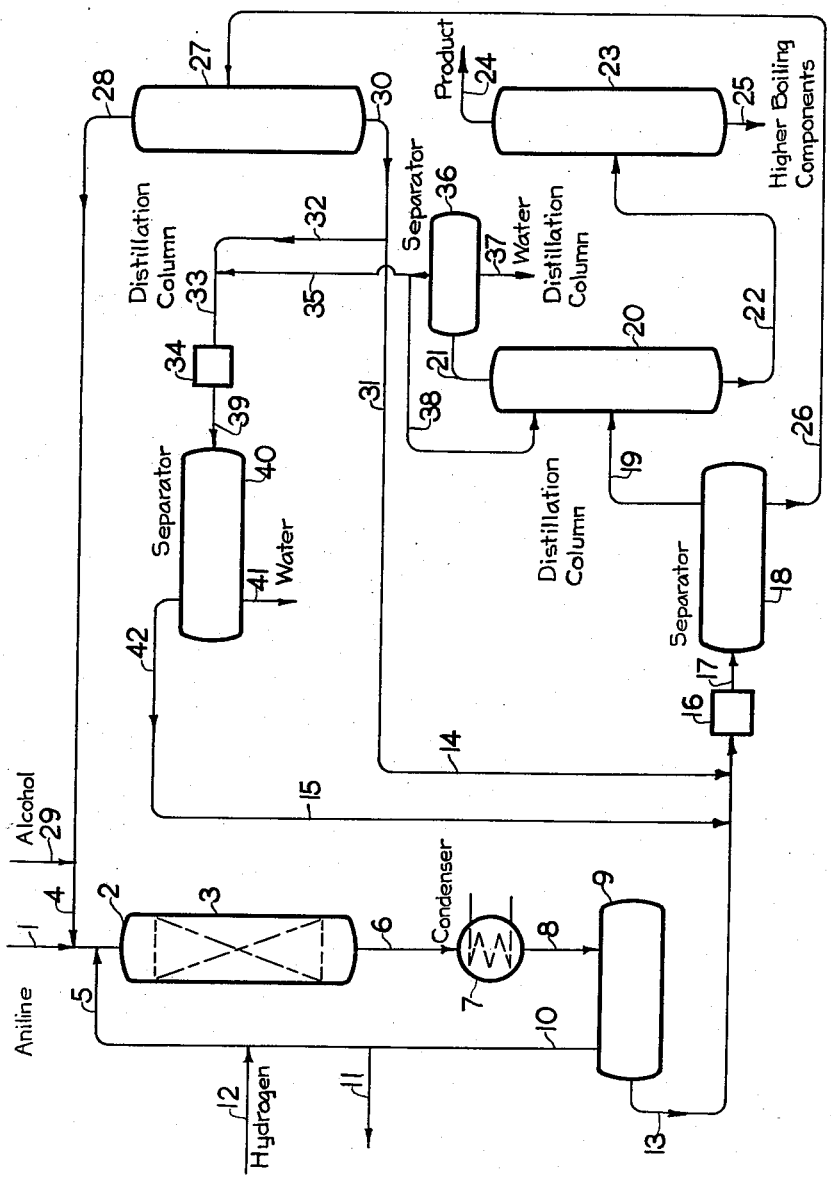
Inventors: Thomas J. Deahl
Fred H. Stross
Marion D. Taylor
By their Attorney: Millard L. Caldwell

Patented Dec. 25, 1951

2,580,284

UNITED STATES PATENT OFFICE 2,580,284

PRODUCTION OF SECONDARY AROMATIC AMINES

Thomas J. Deahl, Fred H. Stross, and Marion D. Taylor, Berkeley, Calif., assignors to Shell Development Company, San Francisco, Calif., a corporation of Delaware Application April 11, 1949, Serial No. 86,684

8 Claims. (Cl. 260—577)

This invention relates to a new catalytic method of producing secondary cyclic amines by reacting the corresponding primary cyclic amines with lower boiling carbinol compounds. It deals particularly with a novel method of carrying out these reactions in the presence of a catalytic mixture of metallic copper, alumina and another difficultly reducible metal oxide, whereby secondary cyclic amines may be produced efficiently and economically. The invention offers special advantages for the production of N-methylaniline from aniline and methanol. This reaction has hitherto not been successful commercially because the relatively close boiling points of aniline, N-methylaniline and N,N-dimethylaniline made purification of the product difficult and expensive so methods based on the reaction were not competitive with other procedures for producing N-methylaniline. The process of the invention eliminates such purification difficulties by making it feasible to obtain such high conversions—indeed, under the preferred conditions using a stoichiometric excess of alcohol, substantially quantitative conversions—of aniline to N-methyl-aniline with such complete suppression of N,N-dimethylaniline formation that elaborate purification can be dispensed with and a satisfactory product obtained by simple distillation to remove excess unreacted alcohol and the water formed in the reaction.

It has long been known that primary cyclic amines may be reacted with carbinol compounds in the presence of suitable catalysts to produce higher amines, that is, the corresponding secondary and tertiary amines. Thus, Mailhe and De Godon, Compt. rend., 166, 467 and 564 (1918), used alumina or thoria as catalyst in the N-alkylation of primary cyclic amines such as aniline, toluidine, xylidines and naphthylamines with alcohols. E. and K. Smolenski, Roczniki Chemji, 1, 232–42 (1941), Chem. Zentralblatt, III, 204 (1923), used kaolin as a catalyst in the production of dimethylaniline from aniline and methanol. Other catalysts which have been used for reactions of this type include oxides such as silica, titania, zirconia, molybdenum oxide, iron oxide, chromium oxide, zinc oxide, and stannous oxide, metals such as nickel, cobalt, copper and iron, and salts such as silicates or phosphates of aluminum, etc. In this prior work it was found that, while the ratio of secondary amine to tertiary amine which was produced could be influenced by controlling the proportion of alcohol to primary cyclic amine in the feed since an excess of primary amine favored the formation of secondary amines, nevertheless it was not feasible to obtain high conversions of primary amine without producing undesirably large amounts of tertiary amines. Thus, using silica gel at 350° C.–370° C., Brown and Reid, J. Am. Chem. Soc., 46, 1836 (1924), obtained a 52% conversion of aniline to mono- and dimethylanilines (mole ratio of mono- to di- being 5:3). The reaction of ethanol or methanol with aniline for about 12 hours at 170° C.–180° C. with 5% of nickel in suspension as catalyst is reported by Guyot and Fournier, Compt. rend., 189, 927–9 (1929), Bull. Soc. Chim. 47, 203–10 (1930), to give a conversion of aniline of only about 30%, while Shuykin, Balandin and Plotkin, J. Phys. Chem. 39, 1197 and 1207 (1935), report that in the reaction of aniline with methanol using as catalyst 10% of $Fe_2O_3$ on alumina at 350° C. the conversion of aniline was about 45%. Such low conversions and/or yields make the production of secondary cyclic amines from the corresponding primary amines and alcohols quite expensive. Not only do they result in low plant capacity but also they lead to increased costs in the recovery of the product since the separation of the desired secondary cyclic amine from the other components of the reaction mixture is often quite difficult. For instance, as previously pointed out, aniline, N-methylaniline and N,N-dimethylaniline boil so close together at 184.4° C., 195.7° C. and 193.5° C., respectively, that their separation by ordinary distillation methods is too expensive for commercial use. Another disadvantage of the prior methods of carrying out the reaction has been the loss of alcohol which occurs through side reactions.

An important object of the present invention is the provision of a process for producing secondary cyclic amines, particularly secondary aromatic amines, while avoiding or greatly minimizing the foregoing disadvantages of the prior procedures. More particularly, it is an object of the invention to provide a new catalytic method for the reaction of primary cyclic amines with alcohols to obtain high selectivity in the production of the corresponding secondary amines, while at the same time obtaining high conversions of the starting amine. Another object is the catalytic production of secondary cyclic amines in a continuous manner with minimum interruption for catalyst regeneration and at relatively low temperatures at which side reactions are reduced. A specific object is to produce secondary aromatic amines uncontaminated with difficultly separable by-products of the reaction so that recovery is simplified and the final cost of the product is reduced. Still other objects and advantages of the invention will be apparent from the following description wherein the application of the new process to the production of N-methylaniline will be emphasized because of the special problems involved with this particular secondary cyclic amine, as previously indicated. It will be understood, however, that this application of the invention is merely illustrative of the reactions which have been successfully carried out by the new process and that the same procedure is applicable not only to the production of a wide variety of other secondary aromatic amines such as other N-alkylanilines, N-alkyltoluidines, N-alkylxylidines and N-alkylnaphthylamines, but also to the manufacture in an analogous manner of secondary heterocyclic amines or secondary alicyclic amines such, for example, as N-alkylcyclohexylamines.

It has now been found that, by the use of certain special catalyst mixtures, the conversion of primary cyclic amines to the corresponding secondary amines by reaction with a lower alcohol, i. e. a hydroxy-substituted hydrocarbon of not more than six carbon atoms per molecule, can be carried out with remarkable selectivity. By the use of this new type of catalyst it has been found unexpectedly that, even in the presence of a very substantial stoichiometric excess of the alcohol, primary cyclic amines are converted substantially exclusively to the corresponding secondary cyclic amines and formation of tertiary amines is negligible. By using an excess of alcohol, high conversions of the cyclic amine are achieved and, thus, products are obtained which contain little or no starting primary amine, while at the same time formation of tertiary amines is minimized so that purification problems are avoided. This shows the remarkable selectivity of the new process since the results are contrary to what would be expected on the basis of the law of mass action.

Furthermore, the high activity of the catalyst makes it feasible to carry out the reaction at relatively low temperatures, for example, of the order of 200° C. to 275° C., and thus minimize undersirable side reactions, although higher temperatures up to 350° C. can be used satisfactorily. The process has been found to be capable of continuous operation for long periods without interruption because the catalysts maintain their high activity, are resistant to poisoning by impurities in the feed when used with feeds of commercially available purity, and are highly stable. All these improvements contribute to making the new process most efficient and economical for its intended purpose.

The catalysts used in the process of the invention comprise, as essential components, metallic copper, alumina and at least one other difficultly reducible oxide. Other components such as carriers, supports or diluents, etc. which do not interfere with the reaction may be present but are not necessary and, as a rule, are less preferable than catalysts consisting essentially of only the three essential components specified.

An activated alumina, preferably one high in böhmite, is the most desirable form of alumina for use in the catalyst. Suitable aluminas having preferably a relatively high surface area may be prepared from natural bauxite or may be synthetically produced. Whatever the source or nature of the alumina chosen, it is advantageous to employ one which has developed, or will develop during preparation and/or use of the catalyst, a minimum number of pores of 10–20 Å., since such small pores appear to give the catalyst a residual activity for the decomposition of any excess alcohol which may be present in the reaction. The preparation of adsorptive aluminas of controlled characteristics is a well established art, and suitable aluminas are commercially available so their method of manufacture need not be described.

As the other difficultly reducible metal oxide used as activator with the copper and alumina in the catalyst, those of the polyvalent metals are especially advantageous, although oxides of the alkali metals, such as potassium, sodium and the like, may also be employed. Oxides of metals of the first and second transition series are another useful class of oxides which may be applied. The following, in the order of decreasing preference, are examples of some of the difficultly reducible oxides which have been used in the preparation of catalysts which are advantageous in the process of the invention: calcium oxide, zinc oxide, chromium oxide, magnesium oxide, ferrous oxide, cadmium oxide, and potassium oxide. These oxides may be used individually or as mixtures of two or more such difficultly reducible metal oxides. The difficultly reducible oxide or oxide mixture used is preferably employed in an amount equal to at least half the weight of copper used, but amounts corresponding to five or more times the weight of copper have been successively employed. Among other advantages resulting from the presence of an activating difficultly reducible oxide in the catalyst is a material increase in the effective life of the catalyst in the process.

The proportions in which the copper, alumina and other difficultly reducible oxide may be present may vary widely. Good results have been obtained with as little as 0.5% copper based upon the total weight of copper, alumina and other difficultly reducible oxide used, but amounts as high as 30% and more have also been successfully used. It will be understood that these percentages are based upon the total copper content of the catalyst and do not necessarily indicate that all such copper is present in the metallic form in the final catalyst, although the greater part should be in metallic form. Particularly good results have been obtained with catalysts containing about 2% to 20% copper and having a molar ratio of activating difficultly reducible oxide (other than alumina) to copper of about 0.2:1 to about 4:1, most advantageously a molar ratio of about 0.2:1 to 2:1.

The catalyst may be readily prepared by impregnating the chosen alumina with suitable salts of copper and the difficultly reducible metal selected, for example, from the nitrate, acetate, or the like, then calcining to convert such salts to the corresponding oxides and reducing at least a part of the resulting copper oxide in a stream of hydrogen. It has been found highly advantageous to carry out the calcination and reduction at a moderately low temperature; temperatures between about 250° C. and 400° C. have been used. Too low temperatures at which excessive times of treatment are required for decomposing the salts to the oxide and/or for reduction of the resulting copper oxide to metallic copper are undesirable, while too high temperatures are to be avoided because the resulting catalyst is less active. In fact, it has been found that a catalyst of maximum activity and selectivity will usually not be obtained if the catalyst is exposed to temperatures above about 450° C. in the decomposition step. This consideration influences the choice of the compounds used as source of the copper and difficultly reducible oxide or oxides in preparing the catalyst and makes it desirable to avoid compounds which require high temperatures for their decomposition. For the same reason it is advantageous to use moderate temperatures in the final reduction step. While highly selective catalysts having a long life in the process are obtained in this way, the invention is not limited to impregnation methods of catalyst preparation since coprecipitation or other procedures may be used. It will also be understood that the presence of other components, whether active or inert, in the catalyst is not excluded. For example, the three essential components may be used on a support or carrier such as kieselguhr, silica gel, carbon or the like and/or stabilizers or activators for the catalyst may also be incorporated therewith.

The reaction conditions which will be most suitable for the production of secondary cyclic amines according to the invention will vary somewhat depending upon the particular primary cyclic amine or amines and the alcohol or alcohols used as feed, as well as upon the particular difficultly reducible metal oxide or oxides chosen for use with the copper and alumina. As a rule, operations with the reactants in the vapor phase are preferred because the process may be carried out continuously with simple apparatus by this method. It is feasible, however, to use liquid phase methods of reaction, and where one or both of the reactants are very high boiling it may be preferable to carry out the reaction with such reactant or reactants in the liquid state. In such cases the catalyst may be employed as a suspension in the liquid reactant and vapors of the other reactant may be intimately contacted therewith under reaction conditions or the finely divided catalyst may be suspended in a liquid mixture of both reactants. Alternatively, the catalyst may be in the form of a stationary mass or masses through which the reactants are passed in the liquid or mixed liquid-vapor phase. For the preferred vapor phase operations, catalyst tubes or towers, in which trays, baskets or inert packing may be used to support the catalyst, if desired, may be employed and the reactants passed therethrough to a condenser for recovering the product.

The attached drawing is a schematic flow diagram of an especially advantageous method of carrying out this process for the manufacture of N-methylaniline from aniline and methanol. The same principles may be applied, however, for the vapor phase reaction of any suitable primary cyclic amine with any suitable carbinol compound by proper rearrangement of connecting lines in accordance with the differences in boiling points and/or solubilities of the different components involved.

As shown in the drawing, a primary cyclic amine such as aniline, from a source not shown, is fed by line 1 to a catalytic reactor 2 containing, for example, a copper-calcium oxide-alumina catalyst in a central portion 3. The reactor may, for example, be of the isothermal type, e. g. a 4- to 8-inch diameter tube with a jacket for circulating oil or other heat transfer medium, or of the adiabatic type, in which case a large diameter reactor containing a number of catalyst beds separated by vaporizing trays is suitable. Thus, it has been found that aniline and hydrogen can be introduced as vapor at the bottom tray of such an adiabatic type reactor together with $1/n$ of the required amount of alcohol, e. g. methanol, (where $n$=the number of vaporizing trays in the reactor) as liquid or vapor depending on the temperature of the aniline and hydrogen vapors. Cooling of the vapors after reaction in the first catalyst bed is effected by vaporization of the alcohol introduced as liquid on the tray above. The heat of reaction of aniline and methanol, about 10 kcal./mole, is balanced by the heat of vaporization of the methanol, about 9 kcal./mole and the radiation in this arrangement.* In any case, the aniline or other primary cyclic amine with the carbinol compound to be aminated, in the present case methanol, supplied in regulated amounts by line 4 and hydrogen admitted via line 5 are passed in vapor phase, preferably under a fairly low pressure, preferably in the range of about 30 to about 60 p. s. i. gage, over the catalyst 3 and the reaction mixture is withdrawn by line 6 to condenser 7. The condensate and accompanying gases flow by line 8 to an accumulator and gas separator 9 from which the separated gas is recycled back to the reactor by lines 10 and 5. Some of the gas may be vented by line 11 to prevent excessive accumulation of impurities in the system and a corresponding amount of make-up hydrogen may be supplied by line 12.

The liquids from accumulator 9 are withdrawn by line 13 and mixed with water, added by line 14, and suitable selective solvent for the amination products, e. g. a hydrocarbon such as $C_7$ fraction of petroleum products, supplied by line 15 to aid in the phase separation. The resulting mixture passes to mixer 16 and then by line 17 to separator 18. In some cases, it may be desirable to employ more than one extraction stage for the separation of unreacted alcohol from the amines in the reaction product. The oil phase from separator 18 is fed via line 19 to a distillation column 20 where the dissolved water and solvent, e. g. hydrocarbon, are removed overhead by line 21. The bottoms from column 20 are fed by line 22 to column 23 which serves to flash overhead the amination product, e. g. methylaniline, by line 24. Any small amount of higher boiling products may be removed by line 25. The secondary amine products recovered in this way are generally sufficiently pure to be used for most purposes without any further treatment. However, in some cases it may be desirable to employ a further purification step. Thus, for example, for the removal of N,N-dimethylaniline from N-methylaniline, advantage may be taken of the discovery that N,N-dimethylaniline forms an azeotrope with aniline containing about 85%–90% of aniline and 15%–10% of dimethylaniline and boiling less than 0.5° C. lower than aniline at atmospheric pressure but about 1.5° C.–2.5° C. lower than aniline at 90–100 mm. Hg pressure. The existence of this azeotrope makes it feasible to obtain N-methylaniline of high purity from mixtures of N-methylaniline and N,N-dimethylaniline by adding the proper amount of aniline to the mixture and fractionating, as described and claimed in our copending application Serial No. 253,752, filed October 29, 1951. The dimethylaniline thus removed may be recovered from the azeotrope and the aniline returned to the process.

From separator 18 the aqueous phase containing the unreacted alcohol, e. g. methanol, is fed by line 26 to fractionating column 27 where the alcohol is removed overhead by line 28 and returned by line 4 to the reaction with make-up alcohol introduced by line 29 to compensate for that consumed in the process. The thus-recycled alcohol need not be pure since it has been found that moderate quantities of water in the feed have no adverse effect on the preferred catalyst. The bottoms from column 27 (water containing a small amount of dissolved anilines) are removed by line 30 and fed in part by line 31 to line 14 for the extraction of further alcohol. The remainder of the aqueous bottoms is passed by lines 32 and 33 to mixer 34 together with hydrocarbon introduced by line 35. The hydrocarbon supplied by line 35 is that recovered from the overhead product of column 20 after condensation and stratification in separator 36 to separate water withdrawn by line 37. A part of the hydrocarbon phase from separator 36 is returned as reflux to column 20 by line 38. Mixer 34, like mixer 16, may be any suitable device for intimately contacting immiscible liquids, the object being to scrub the amine solution to recover amines therefrom. The mixture from unit 34 is fed by line 39 to settler 40 in which the substantially amine-free water is separated and removed by line 41 while the hydrocarbon phase containing the extracted amines is fed by line 42 to line 15 for the further use in unit 16 as previously described.

Temperatures of the order of about 200° C. to 350° C. have been successfully used in the process. The best temperature to use within this range depends on the type of difficultly reducible metal oxide used with the copper and alumina in the catalyst, the operating pressure and the catalyst activity. At elevated pressures, the optimum temperature is usually higher when using alkaline earth metal oxides such as calcium and magnesium oxides as activators than when other group II metal oxides, e. g. zinc and cadmium oxides, are employed. At atmospheric pressure, copper-zinc oxide-alumina and copper-calcium oxide-alumina catalysts give about the same results at 250° C. Higher temperatures can be used with catalysts whose activity has been diminished through extended use than are advisable with fresh catalysts. Typical results of varying the temperature in the reaction of aniline with methanol are shown by the following figures obtained in tests carried out at 30 p. s. i. g. using a feed of aniline, methanol and hydrogen in the mole ratio of 1:1.5:2.5, at a liquid hourly space velocity of aniline of 1.5 and an apparent contact time of 2.8 seconds.

| Catalyst (fresh) | Temp. | Conversion of Aniline | Yield of N-Methylaniline |
|---|---|---|---|
| | ° C. | | |
| Copper, 5%; zinc oxide, 13%; alumina, 82%. | 225 | 52 | 100 |
| | 250 | 94 | 93 |
| | 285 | 92 | 97 |
| | 325 | 81 | 97 |
| Copper, 5%; calcium oxide, 9%; alumina, 86%. | 250 | 64 | 100 |
| | 285 | 98 | 98 |
| | 325 | 98 | 98 |

The pressure used in the process may be atmospheric or above, conveniently pressures of 30 to 60 p. s. i. gage. The effect of pressure in typical runs carried out with aniline and methanol are shown by the following figures:

| Catalyst | Temp., ° C. | Press., p. s. i. g. | Feed-Mole Ratio Aniline:Methanol:Hydrogen | Conversion Mole Per Cent [1] |
|---|---|---|---|---|
| Copper, 4.5% to 5%; zinc oxide, 11.2% to 13%; alumina, 82% to 84.3%. | 250 | 0 | 1:1 :5.2 | 82 |
| | 250 | 45 | 1:1 :5.4 | 75 |
| | 250 | 0 | 1:1.5:2.5 | 96 |
| | 250 | 30 | 1:1.5:2.5 | 94 |
| | 250 | 0 | 1:2 :3 | 99 |
| | 250 | 30 | 1:2 :2 | 88 |
| Copper, 4.5% to 5.1%; calcium oxide, 8.4% to 9.1%; alumina, 85.8% to 87.1%. | 250 | 0 | 1:1.5:2.5 | 83 |
| | 250 | 30 | 1:1.5:2.5 | 65 |
| | 275 | 0 | 1:2 :3 | 99+ |
| | 285 | 30 | 1:2 :2 | 99+ |
| | 285 | 60 | 1:2 :2 | 98 |

[1] After processing about 20 volumes of aniline per volume of catalyst.

With a lower aliphatic alcohol and aniline in the vapor phase as the feed, it has been found that feed rates corresponding to liquid hourly space velocities of about 0.5 to 5.0, which give apparent contact times of about 0.5 to about 15 seconds, give satisfactory results. The reactants may be used in about stoichiometric proportions and efficient conversions may be achieved without excessive side reactions, but it is generally more desirable to use a stoichiometric excess of carbinol compound. As a rule, molar ratios of primary cyclic amine to alcohol between about 1:1 and 1:4 are generally preferred, although lower or higher ratios may be employed. It is a feature of the invention that an excess of alcohol may be successfully used and high conversions of the starting cyclic primary amine obtained without substantial formation of tertiary amines in the process. This greatly simplifies the recovery of the desired cyclic secondary amine product which can often be obtained by the new method in a form suitable for use by simple distillation to remove the excess alcohol used and the water formed in the reaction.

It has been found advantageous to carry out the reaction in the presence of hydrogen, although this is not essential to the invention. A substantial increase in the conversion of the primary cyclic amine being reacted has been obtained by the use of hydrogen partial pressures between about 0.25 and 2.0 atmospheres, for example. Diluents, such as nitrogen, paraffin hydrocarbons, etc. may also be used in the process. When using methanol as the alcohol in the reaction, it may be desirable to employ carbon monoxide in the feed as an aid in suppressing decomposition of the alcohol. Thus, for example, feed mixtures containing a primary aromatic amine, methanol, hydrogen and carbon monoxide in mole proportions of 1:2:2:1 and 1:1:1:1, respectively, have been successfully used in the process.

For the production of N-methylaniline under conditions of substantially complete conversion of aniline without substantial N,N-dimethylaniline formation, the following reaction conditions are preferred:

*Feed.*—Aniline, methanol and hydrogen in mole ratios of 1:1.2–3:1–5, most preferably a mole ratio of about 1:2:2
*Temperature.*—Between 225° C. and 325° C., most preferably 250° C. to 280° C. with a copper-alumina-zinc oxide catalyst and 275° C. to 325° C. with a copper-alumina-calcium oxide catalyst
*Pressure.*—Atmospheric pressure to 100 p. s. i. g., preferably about 30 to 60 p. s. i. g.
*Feed rate.*—Liquid hourly space velocity of about 1.0 to 3.0

The following examples illustrate specific applications of the new process of the invention and show some of its advantages.

*Example I*

Copper and zinc nitrates in the molar ratio of 1:2 were dissolved in water and the solution was poured onto a quantity of adsorptive alumina ("Alorco Grade A"). After adsorption of the solution, during which the temperature rose 50° C.–70° C., the catalyst was placed in a glass tube furnace and heated for four hours at 450° C. in a stream of air to convert the nitrates to metal oxides. Analysis of the resulting mixture showed that it contained 4.6% copper and 9.0% zinc. The green-colored mass was cooled, removed from the furnace tube, screened to remove particles smaller than 40 mesh and packed into the central section of a steel reactor tube, of one-inch diameter, mounted vertically in a furnace. The catalyst was activated by sweeping with hydrogen at 240° C. for eight hours to reduce the copper oxide to metallic copper without reduction of the zinc oxide.

Using 50 cc. of this black-colored catalyst, equivalent to a height of about 10 cm. in the reactor tube, with glass beads above and below the catalyst, aniline, methanol and hydrogen were passed through the reactor to a condenser for collecting the liquid products and a meter for measuring the uncondensed gas. In one typical run the following reaction conditions were maintained:

Temperature _____ 250° C.
Pressure _____ Atmospheric
Aniline : methanol : hydrogen mole ratio _____ 1:1.5:2.5
Liquid hourly space velocity of total liquid feed_____ 0.89

During the period of 100 to 125 hours on stream the following results were obtained:

Composition of washed and dried product, weight per cent—
    Aniline_____ 2.8
    Methylaniline_____ 96.1
    Dimethylaniline_____ 1.1
Conversion of aniline to methylated products_____mole per cent__ 96.8
Yield of monomethylaniline (based on aniline)_____mole per cent__ 99.0
Decomposition of methanol to gaseous products (lbs./lb. of methylaniline produced) _____ 0.09

Equally good results are obtained when reacting ethanol with metatoluidine under the same conditions.

Example II

A catalyst was prepared from copper nitrate, calcium nitrate and adsorptive alumina ("Alorco Grade A") using the same procedure as in Example I, except that the components were proportioned so as to give a catalyst containing 4.4% copper and 5.5% calcium, by weight, after decomposition but before the reduction of the copper oxide.

Using the same apparatus as in Example I, aniline was reacted with methanol in the presence of this catalyst under the following conditions:

Temperature _____ 275° C.
Pressure _____ Atmospheric
Aniline : methanol : hydrogen mole ratio _____ 1:2:3
Liquid hourly space velocity of total liquid feed _____ 0.80
Duration of run, hours _____ 126.5
Volumes of aniline processed per volume of catalyst _____ 54

During the last 26.5 hours of operation the following results were obtained:

Composition of washed and dried product, weight percent—
    Aniline _____ 0.3
    Methylaniline _____ 99.2
    Dimethylaniline _____ 0.5
Conversion of aniline to methylated products_____mole percent__ 99.7
Yield of monomethylaniline (based on aniline) _____mole percent__ 99.6
Decomposition of methanol to gaseous products (lbs./lb. of methylaniline produced) _____ 0.05

There was no noticeable decline in activity of either this catalyst or that used in Example I when the runs were terminated.

Substituting cyclohexylamine for the aniline in this process one similarly obtains N-methylcyclohexylamine in excellent yields and conversions.

Example III

Tests made with catalysts containing other difficultly reducible metal oxide promoters gave the following results:

Copper (4.2%), magnesium oxide (11.7%), alumina.

With a feed mixture of aniline, methanol and hydrogen (1:1:2 moles) at 250° C. the conversion of aniline was 40% and the yield 99%; at 300° C. these were 89% and 98%, respectively.

Copper, chrominum oxide, alumina; copper, iron oxide, alumina; copper, manganese oxide, alumina.

These catalysts tested with the above feed mixture at 250° C. gave conversions of aniline of 72%, 69% and 70%, respectively, and yields of 99%, 98% and 99%, respectively. These conversions could be improved by operation with a higher ratio of methanol to aniline, and/or the use of higher temperatures or longer contact times.

Similar results were obtained with catalysts containing the oxides of potassium, cadmium, strontium, molybdenum or vanadium.

Example IV

Copper-chrome-alumina catalysts were prepared having molar ratios of copper to chromium of 3:1 and 1:2 by impregnating an adsorptive alumina with copper and chromium nitrates, and then reducing with hydrogen at 290° C.–300° C. for eight hours. The following results were obtained in reacting methanol with aniline in equal molecular amounts in the presence of these catalysts under different conditions:

| Ratio of Cu to Cr in Catalyst | Liquid Hourly Space Velocity of Feed | Temp., ° C. | Mole Per Cent Conversion of Aniline to Methylaniline | Mole Per Cent Yield of Methylaniline |
|---|---|---|---|---|
| 3:1 | 0.9 | 350 | 56 | 97 |
|  | 0.9 | 275 | 64 | 97 |
| 1:2 | 0.9 | 301 | 74 | 98 |
|  | 0.9 | 350 | 50 | 93 |

Example V

The following results illustrate some of the various combinations of reaction conditions which give good results in long periods of operation in the production of N-methylaniline:

| Catalyst [1] | Feed-Mole Ratio Aniline:Methanol:Hydrogen | Reaction Conditions— | | | Mole Per Cent | |
|---|---|---|---|---|---|---|
| | | Temp., °C. | Press., p.s.i.g. | Apparent Contact Time, secs. | Conversion of Aniline | Yield of Aniline |
| Cu: Zn: | | | | | | |
| 4.5, 9.0 | 1:1.3:2.2 | 250 | 0 | 2.8 | 97 | 98 |
| 6.8, 13.9 | 1:1.5:2.5 | 250 | 0 | 2.8 | 97 | 99 |
| 4.5, 9.0 | 1:2 :3 | 250 | 0 | 2.8 | 100 | 94 |
| Cu: Zn: | | | | | | |
| 4.5, 6.0 | 1:2 :3 | 275 | 0 | 2.8 | >99 | >99 |
| 4.9, 6.2 | 1:2 :2 | 285 | 30 | 2.9 | 100 | 98 |
| 4.9, 6.2 | 1:1.5:2.5 | 285 | 30 | 2.9 | 97 | 99 |
| 4.9, 6.2 | 1:2 :2 | 285 | 60 | 2.9 | 98 | 98 |

[1] Copper-metal oxide-alumina, wt. per cent of metals before reduction.

Example VI

The advantages of using an excess of alcohol and of employing hydrogen in the feed are shown by the following results obtained in reacting methanol with aniline at 250° C., atmospheric pressure and 2.7–3.0 seconds contact time, using copper-zinc oxide-alumina catalysts containing 4.5%–6.8% of copper and 9%–13.9% of zinc as determined by analysis before reduction.

| Feed-Mole Ratio Aniline:Methanol:Hydrogen | Wt. Per Cent [1] | | Mole Per Cent Conversion of Aniline | Mole Per Cent, Yield of N-methylaniline [2] |
|---|---|---|---|---|
| | Cu | Zn | | |
| 1:1 :2 | 4.5 | 9 | 82 | 99 |
| 1:1.3:2.2 | 4.5 | 9 | 94 | 95 |
| 1:2 :3 | 4.5 | 9 | 98 | 93 |
| 1:1 :2 | 6.8 | 13.9 | 82 | >99 |
| 1:1 :5.2 | 6.8 | 13.9 | 82 | >99 |
| 1:1 :0.5 | 6.8 | 13.9 | 78 | >99 |
| 1:1 :0 | 6.8 | 13.9 | 67 | >99 |

[1] In catalyst before reduction.
[2] Based on the aniline fed.

Example VII

Some results of the effect of variations in the catalyst composition are shown by the following data obtained at 250° C. and 2.8–3.0 seconds apparent contact times:

| Weight Per Cent of metal [1] | Feed-Mole Ratio Aniline:Methanol:Hydrogen | Press., p.s.i.g. | Mole Per Cent Conversion based on the aniline— | |
|---|---|---|---|---|
| | | | After 2–4 hrs. | After 11–14 hrs. |
| 4.8 Cu, 9.0 Zn | 1:1 :2 | 0 | 80 | 82 |
| 2.3 Cu, 4.4 Zn | 1:1.5:2.5 | 30 | 86 | 73 |
| 5.0 Cu, 10.4 Zn | 1:1.5:2.5 | 30 | 97 | 94 |
| 4.1 Cu, 3.1 Zn | 1:1.5:2.5 | 30 | 93 | 86 |

[1] In copper-metal oxide-alumina catalyst as determined before reduction.

Similar results are obtained when other difficultly reducible metal oxides are used in the catalyst in place of the zinc oxide; thus, the substitution of calcium oxide or oxides of other group II metals likewise gives catalysts which give high conversions and high yields of N-monoalkylanilines.

The effect of substituting other metals for the metallic copper used in the catalyst of the invention is shown by the results obtained with a nickel-zinc oxide-activated alumina catalyst prepared by the method described in connection with Example I except that a final reduction temperature of 275° C. was used. The catalyst contained 4.0% nickel and 9.0% zinc after decomposition to the oxides but before reduction. Under the same reaction conditions as in Example III, except at a temperature of 306° C., this catalyst gave a conversion of only 22%. By increasing the temperature to 350° C. the conversion could be increased to 37% but the yield then was only 95% of total methylated products and the dimethylaniline content of the product was 2 to 5 times that of the products obtained in Examples I to III. With silver, zinc or chromium oxide-adsorptive alumina catalysts under analogous conditions, conversions of less than 40% were also obtained. This is also the case when copper oxide is substituted for the metallic copper of the catalyst of the invention.

When a siliceous material such as the diatomaceous earth marketed by Johns-Manville as "Celite 8" is used in the catalyst instead of an adsorptive alumina, very poor conversions are obtained under conditions comparable to those used in the foregoing examples. Thus, a catalyst containing 6.8% copper and 13.9% zinc with "Celite 8" gave a total conversion of less than 40% when aniline, methanol and hydrogen in a mole ratio of 1:1:2 were passed over it at atmospheric pressure and 248° C., using an apparent contact time of 2.8 seconds.

Other reactions which can be carried out successfully in the same way as the foregoing are illustrated by the following examples:

Example VIII

Using a copper-zinc oxide-alumina catalyst which contained 4.8% copper and 9.3% zinc by weight, as analyzed before reduction, i. e. a mole ratio of copper to zinc of 1:1.9, isopropyl alcohol was reacted with aniline. The feed contained aniline, isopropyl alcohol and hydrogen in the mole ratio of 1:1.5:2.5, respectively. At a temperature of 250° C. and 2.8 seconds apparent contact time at atmospheric pressure, the conversion of aniline to N-isopropylaniline was found to be 60% after seven hours. The yield of N-isopropylaniline, based on the aniline fed, was 92.5%. The product boiled at 202-3° C. at 762 mm., uncorrected.

Example IX

Allyl alcohol was reacted with aniline using the same catalyst and conditions used in Example VIII. Distillation of the product after extraction with saturated sodium chloride solution and drying with anhydrous calcium sulfate showed a 61% conversion of the aniline to N-n-propylaniline, boiling 218° C.–219° C. at 762 mm.

In the same way para-xylidine reacts with methanol to produce N-methyl para-xylidine, ortho-chloraniline reacts with isopropyl alcohol to produce N-isopropyl ortho-chloraniline, 2-aminopyridine reacts with ethyl alcohol to produce ethyl pyridylamine, tetrahydro-alpha-naphthylamine reacts with butyl alcohol to produce N-butyl tetrahydro-alpha-naphthylamine, and ortho-aminophenol reacts with methanol to produce N-methyl ortho-aminophenol.

It is often advantageous to carry out the reactions with the cyclic primary amine in the liquid phase instead of the vapor phase as in the foregoing examples. This is the case in the following reactions: para-nitroaniline with methanol to produce N-methyl paranitroaniline; alpha-naphthylamine with ethyl alcohol to produce N-ethyl alpha-naphthylamine; and meta-phenylenediamine with methanol to produce N-methyl meta-phenylenediamine.

A wide variety of different carbinol compounds can be used in the foregoing reactions instead of the alcohols specifically described. Thus, ethanol, normal and isopropyl alcohols, normal, secondary and isobutyl alcohols, and the amyl alcohols are examples of lower aliphatic alcohols which have been so used. With unsaturated alcohols such, for example, as allyl and methallyl alcohols saturated amines are produced. Polyhydroxy compounds may be used instead of the foregoing monohydroxy alcohols. Thus, glycol, diethylene glycol, etc. may be used, and the proportion of primary cyclic amine employed therewith may be regulated so that one or more of the hydroxy groups of the carbinol compound are replaced by amino groups. Where the hydroxyl groups of the polyhydroxy compound have substantially the same reactivities, the monoamino products will be mixtures of isomers unless the starting polyhydroxy compound is a symmetrical compound such as ethylene glycol or the like.

As previously indicated, the invention is not limited to the production of the secondary amines described by way of illustration nor to the reaction conditions shown, since the process is also advantageous in the production of other amines under the same or other conditions. It will therefore be understood that the invention is not restricted to the details disclosed by way of illustration, nor to any theory proposed in explanation of the improved results which are obtained.

We claim as our invention:

1. A process for producing a secondary amine which comprises reacting an alcohol of the group consisting of alkanols and alkenols having not more than 4 carbon atoms with a mono $NH_2$-substituted aromatic hydrocarbon, said alcohol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of a solid catalyst consisting essentially of about 2% to about 20% copper, an adsorptive alumina, and about 0.2 to 4 mols per mol of copper, of an oxide of a metal of the group consisting of Ca, Zn, Cr, Mg, Fe, and Mn.

2. A process for producing a secondary amine which comprises reacting an alcohol of the group consisting of alkanols and alkenols having not more than 4 carbon atoms with a mono $NH_2$-substituted aromatic hydrocarbon, said alcohol being present in an amount of from about 1.2 to 2.2 times the stoichiometric amount to produce the secondary amine, said reaction being carried out at a temperature between about 200° C. and 350° C. and a pressure between about atmospheric pressure and 100 pounds per square inch in the presence of at least 0.5 mol of hydrogen per mol of said mono $NH_2$-substituted hydrocarbon and in the presence of a solid catalyst consisting essentially of about 2% to about 20% copper, an adsorptive alumina, and about 0.2 to 2.0 mols per mol of copper, of an oxide of a metal of the group consisting of Ca, Zn, Cr, Mg, Fe, and Mn.

3. A process for producing a secondary amine which comprises reacting methanol with a mono $NH_2$-substituted aromatic hydrocarbon, said methanol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of a solid catalyst consisting essentially of about 2% to about 20% copper, an adsorptive alumina, and about 0.2 to 2.0 mols per mol of copper, of an oxide of a metal of the group consisting of Ca, Zn, Cr, Mg, Fe, and Mn.

4. A process for producing a secondary amine which comprises reacting methanol with aniline, said methanol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of at least 0.5 mol of hydrogen per mol of aniline and in the presence of a solid catalyst consisting essentially of about 2% to about 20% copper, an adsorptive alumina, and about 0.2 to 2.0 mols per mol of copper, of an oxide of a metal of the group consisting of Ca, Zn, Cr, Mg, Fe, and Mn.

5. A process for producing a secondary amine which comprises reacting an alcohol of the group consisting of alkanols and alkenols having not more than 4 carbon atoms with aniline, said alcohol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of a solid catalyst consisting essentially of about 2% to about 20% copper, an adsorptive alumina, and about 0.2 to 2.0 mols per mol of copper of an oxide of a metal of the group consisting of Ca, Zn, Cr, Mg, Fe, and Mn.

6. A process for producing a secondary amine which comprises reacting methanol with aniline, said methanol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of at least 0.5 mol of hydrogen per mol of aniline and in the presence of a solid catalyst consisting essentially of about 2% to about 20% copper, an adsorptive alumina, and about 0.2 to 2.0 mols per mol of copper of calcium oxide.

7. A process for producing a secondary amine which comprises reacting methanol with aniline, said methanol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of at least 0.5 mol of hydrogen per mol of aniline and in the presence of a solid catalyst consisting essentially of about 2% to about 20% copper, an adsorptive alumina, and about 0.2 to 2.0 mols per mol of copper of zinc oxide.

8. A process for producing a secondary amine which comprises reacting methanol with aniline, said methanol being present in an amount between 1 and 4 times the stoichiometric amount to produce the secondary amine, said reaction being carried out at a temperature between about 200° C. and 350° C. and a pressure between about atmospheric pressure and 100 pounds per square inch in the presence of at least 0.5 mol of hydrogen per mol of aniline and in the presence of a solid catalyst consisting essentially of about 2% to about 20% copper, an adsorptive alumina, and about 0.2 to 2.0 mols per mol of copper of magnesium oxide.

THOMAS J. DEAHL.
FRED H. STROSS.
MARION D. TAYLOR.

REFERENCES CITED

The following references are of record in the file of this patent:

UNITED STATES PATENTS

| Number | Name | Date |
|---|---|---|
| 1,449,423 | Lowy et al. | Mar. 27, 1923 |
| 2,394,515 | Goshorn | Feb. 6, 1946 |
| 2,444,509 | Ipatieff et al. | July 6, 1948 |
| 2,515,872 | Heinemann | July 18, 1950 |

FOREIGN PATENTS

| Number | Country | Date |
|---|---|---|
| 124,219 | Great Britain | June 3, 1920 |
| 275,377 | Great Britain | Aug. 11, 1927 |
| 334,579 | Great Britain | Sept. 5, 1930 |
| 553,448 | Great Britain | May 21, 1943 |

OTHER REFERENCES

Mailhe et al.: "Compt. rend.," vol. 172, pp. 1417–1419 (1921).

Shuikin et al.: "Chem. Abstracts," vol. 29, p. 3585 (1935).

Shuikin et al.: "Chem. Abstracts," vol. 30, p. 6346 (1936).